United States Patent [19]

Andersson

[11] Patent Number: 4,673,345
[45] Date of Patent: Jun. 16, 1987

[54] ARRANGEMENT FOR THE MANUFACTURE OF AN ELONGATED ORGAN

[76] Inventor: Kurt G. Andersson, Grevgatan 62, 114 59 Stockholm, Sweden

[21] Appl. No.: 734,968
[22] PCT Filed: Sep. 18, 1984
[86] PCT No.: PCT/SE84/00303
  § 371 Date: May 16, 1985
  § 102(e) Date: May 16, 1985
[87] PCT Pub. No.: WO85/01243
  PCT Pub. Date: Mar. 28, 1985

[30] Foreign Application Priority Data

Sep. 21, 1983 [SE] Sweden ................... 8305106
Mar. 20, 1984 [SE] Sweden ................... 8401526

[51] Int. Cl.$^4$ ............................................ B29C 35/08
[52] U.S. Cl. ...................... 425/174.8 R; 425/233;
          425/292; 425/550; 425/553
[58] Field of Search ............... 425/174.8 R, 547, 550,
    425/553, 233, 235, 292, 407; 264/280, 22, 24,
                                          25, 26

[56] References Cited

U.S. PATENT DOCUMENTS

| 2,312,544 | 3/1943 | Gould et al. ................. 425/553 |
| 2,398,318 | 4/1946 | MacMillin et al. ............ 425/550 X |
| 2,537,182 | 1/1951 | Bertrand ................... 425/174.8 R |
| 2,569,919 | 10/1951 | Bertrand et al. ............. 425/550 X |
| 2,597,923 | 5/1952 | Croston .................... 425/174.8 X |
| 3,149,374 | 9/1964 | Wagner .................... 425/174.8 R |
| 3,277,524 | 10/1966 | Silver ....................... 425/174.8 |
| 3,479,704 | 11/1969 | Reed ...................... 425/174.8 X |
| 3,714,317 | 1/1973 | Folkes ....................... 264/280 X |
| 3,999,919 | 12/1976 | Fukuda ................... 425/174.8 R |

FOREIGN PATENT DOCUMENTS

| 1019951 | 11/1957 | Fed. Rep. of Germany . |
| 1204816 | 11/1965 | Fed. Rep. of Germany . |
| 206821 | 8/1966 | Sweden . |
| 415547 | 10/1980 | Sweden . |
| 416718 | 2/1981 | Sweden . |

Primary Examiner—Richard L. Chiesa
Attorney, Agent, or Firm—Oblon, Fisher, Spivak, McClelland & Maier

[57] ABSTRACT

Arrangement for the manufacture of an elongated organ in which a compression arrangement (14) is so arranged as to displace and compress a quantity of material moistened with a bonding agent. Compressed quantities of material are caused to pass through a heated section (19) operating at high frequency in which two opposing side parts (15, 16) constitute components of a high-frequency apparatus, while two opposing side parts (17) consist of insulating material in the form of borosilicate glass.

4 Claims, 10 Drawing Figures

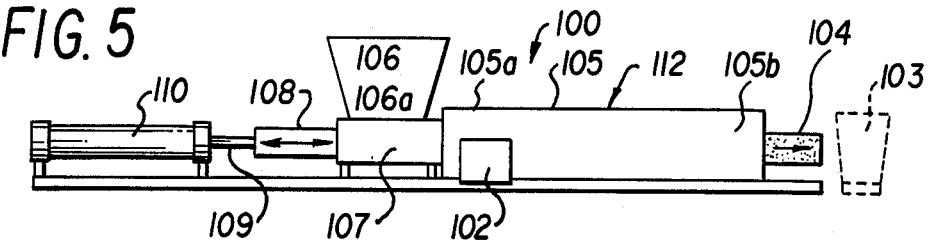
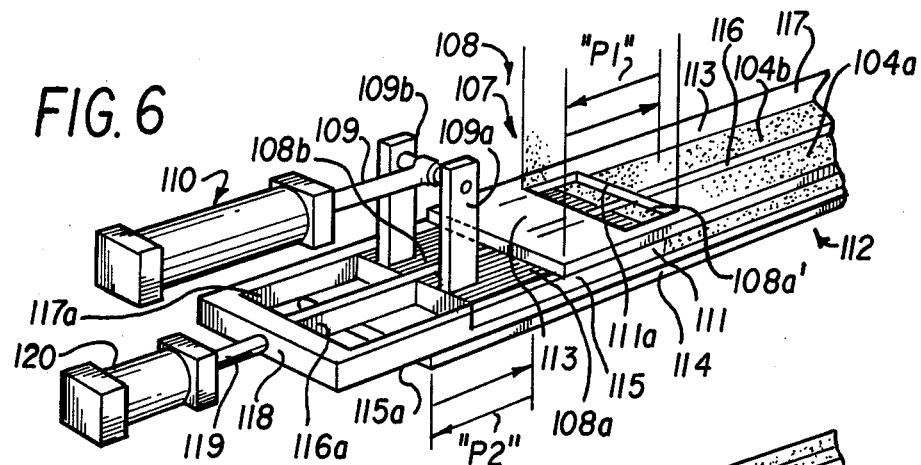
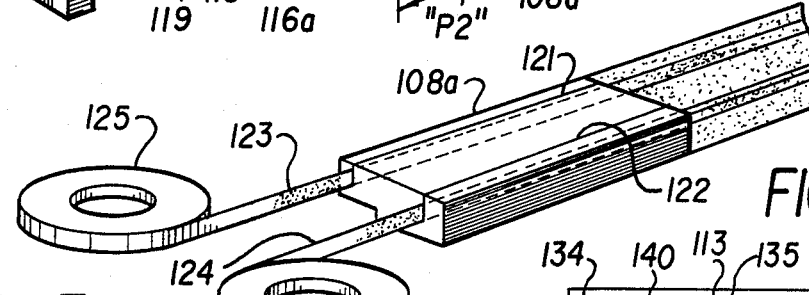
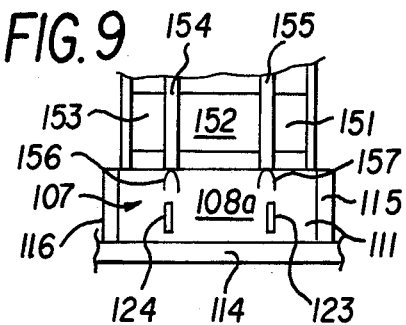
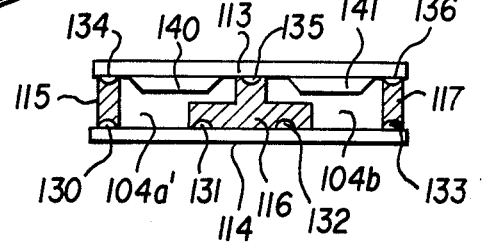
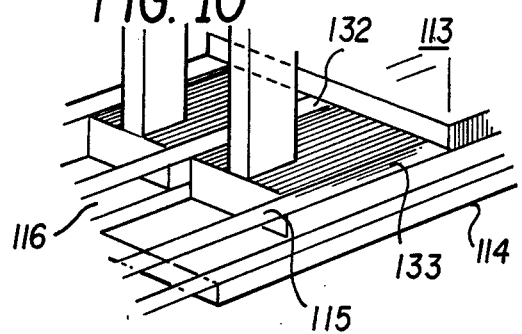

ARRANGEMENT FOR THE MANUFACTURE OF AN ELONGATED ORGAN

TECHNICAL FIELD

The present invention relates to an arrangement for the manufacture of an elongated organ in which a compression arrangement is so executed and arranged as to displace and compress a quantity of material moistened with a bonding agent.

SUMMARY OF THE INVENTION

The present invention relates to apparatus for producing an elongated element, and in particular to such apparatus as those in which fibrous material provided with a binding agent is subjected to compression forces. The apparatus comprises a compression chamber equipped with compressing means, and the fibrous material required to produce the elongated element is introduced into the compression chamber in batches, or all at once. The compressing means are arranged to first subject the fibrous material to compression forces, and to then move the fibrous material along a matrix, whereafter the compressing means are returned and moved out of the compression chamber, which is then filled with a further batch of fibrous material, this further batch then being compressed and displaced along the matrix by the compressing means.

The matrix comprises a plurality of wall sections, of which at least a number are arranged for movement relative to the compressed fibrous material and the aforesaid element, with the relative movement preferably being effected in the direction of the longitudinal axis of said element or in the direction in which it is produced.

The present invention can be applied both in the manufacture of an elongated element having incorporated therein reinforcing rods, bands, wires or like stiffeners, which increase the bending resistance of the element, and also in the manufacture of an elongated element which lacks the inclusion of such stiffeners.

The starting material used to produce the elongated element either comprises a fibre-suspension to which a binder has been added, where the suspension is compressed and then cured to produce a finished element, or a fibrous material which is sprayed or moistened with a binder and the material then subjected to pressure and cured, to form the finished element.

DESCRIPTION OF THE PRIOR ART

Previously disclosed are a large number of different arrangements for the manufacture of an elongated organ in which a compression arrangement is also so arranged as to displace and compress a quantity of material moistened with a bonding agent, in particular an adhesive.

It can thus be mentioned that in German Offenlegungsschrift 1 019 951 is previously disclosed a method of manufacturing an elongated organ by causing a portion of the total quantity of the fibrous material intended for the entire organ to be introduced into a compression chamber where the portion is compressed by a compressing organ. The compressing organ is capable of then being caused to move out of the compression so that a new portion of the fibrous material can be introduced into the compression chamber, which is then compressed once more.

Also previously disclosed in Swedish Patent Specification 416 718 is an arrangement for the manufacture of an elongated organ or product by the compression of a fibrous material to which a bonding agent has been added, in such a way that a portion of the total quantity of the fibrous material intended for the entire organ can be place inside a compression chamber with a compressing organ. The compressing organ is so activated as first to apply compressive force to the portion followed by its displacement into a mould, and then to move in the opposite direction and to be displaced from the compression chamber, which can then be filled once more with a portion of the fibrous material. The new portion is itself compressed and displaced by the compressing organs. It is specifically intended here that the mould shall be so executed as to exhibit a number of wall parts, all of which are caused to move relative to the organ, said relative movement occurring in the longitudinal and/or production sense of the organ.

It is also known, for example from Swedish Patent Specification No. 206 821, in incorporate in wooden beams reinforcing means in the form of square-irons, which form an intermediate layer of ply between two wooden-beam elements, whereafter the beam elements are bonded together. The square-iron reinforcements are fully embedded in the wood, and are placed in mutually facing rectangular recesses located in mutually facing sides of said beam elements, in a manner such that the hypotenuses of the triangles (and therewith one of the diagonal planes of the square-irons) coincide with the mutually abutting abutment surfaces of the sides of said elements. This arrangement provides a large abutment surface between wood and iron.

DESCRIPTION OF THE PRESENT INVENTION

Technical Problem

A particularly challenging technical problem arises in conjunction with the creation of conditions such that the manufacture of elongated organs can take place over a limited length of the production line.

A particularly challenging technical problem also arises in conjunction with the creation of conditions such that the length of the heated section can be kept short, but without departing from the requirement for adequate curing of the bonding agent or adhesive.

A particularly challenging technical problem also arises in conjunction with the creation of conditions such that the moisture released by the curing process in the heated section can be conducted away from the material.

A particularly challenging technical problem also arises, in the case of a heated section which utilizes high frequency, in conjunction with the implementation of measures such that the constituent component parts of the heated section will not short-circuit the high frequency, and yet will still be capable of forming a sufficiently stable wall part to withstand the pressure which occurs, in particular at the mouth of the heated section, and for it also to serve as a compression chamber.

A particularly challenging technical problem arises in conjunction with the execution in the heated section of two opposing side parts of a material exhibiting adequate thermal insulation properties and possessing adequate strength for the intended purpose.

A particularly challenging technical problem also arises, in the case of a heated section which utilizes high frequency, in conjunction with the implementation of measures such that short-circuiting will not occur between high-frequency components executed within the heated section and in particular those components which form part of the compression arrangement and a metering unit or via a piston incorporating the compression arrangement.

A particularly challenging technical problem also arises in conjunction with the creation of conditions such that the wall parts of the heated section can be so arranged as to be capable of displacement in the direction of displacement of the compressed portions of the material, in so doing creating conditions such that, when the portion of material and the wall parts have been introduced into a position approximating that of the compression arrangement, then either all, or in any event two or three, of the wall parts will be capable of simultaneous displacement over a certain distance in a direction away from the compression arrangement, but with the wall parts necessarily remaining capable of subsequent individual displacement in the opposite direction.

Still another problem is one of constructing the compression chamber from simple components and to provide means which generate limited friction when the elongated element is moved along the matrix, and also to provide means which will impart a good surface finish to the outer surface of the elongated element.

Yet another problem in the present art is one of providing a matrix which comprises simple components and which, despite its simplicity, can be used effectively in a high-frequency heating section.

Another problem is one of removing from the matrix, in a simple fashion, moisture created during the heat-treatment process, solely through the design of the structural components forming the matrix.

Another problem is one of providing means which enable a reinforcing band, wire or like stiffening element which will increase the mechanical strength of a finished elongated element to be passed through the compression chamber and the compressing means.

Another problem is one of providing a heating and curing station in which curing of the elongated element, preferably from the centre and outwards, can be effected rapidly.

A further problem is one of providing a heating and curing station in which curing is effected rapidly without causing the elongated element to shrink and without creating internal stresses therein, even in the case of relatively thick elongated elements.

SOLUTION

The present invention relates to an arrangement for the manufacture of an elongated organ in which a compression arrangement is so arranged as to displace and compress a portion of material moistened with a bonding agent.

What is intended here in accordance with the invention is that compressed portions of material shall be so arranged as to pass through a heated section operating at high frequency.

The invention also proposes that two opposing side parts in the heated section shall form parts of a high-frequency apparatus, whilst two opposing side parts shall be in the form of insulating material.

It is additionally proposed that insulating material shall be present between the heated section and a metering unit forming part of the compression arrangement, and that a piston or rod forming part of the compression arrangement shall itself also consist either in full or in part of insulating material.

What is specifically intended in accordance with the invention is that the insulating material shall be in the form of borosilicate glass.

The present invention also proposes an arrangement for the manufacture of elongated organs in which a compression arrangement is so arranged as to displace and compress a portion of material moistened with a bonding agent, preferably towards a previously compressed portion of material, said quantities of compressed material being so arranged as to pass through a heated section.

It is proposed in accordance with the invention that the wall parts of the heated section shall be so arranged as to be capable of displacement in the direction of displacement of the compressed portions of material in such a way that, with the portions of material and the wall parts introduced into a position approximating compression arrangement, all the movable wall parts will be capable of simultaneous displacement over a certain distance in a direction away from the compression arrangement, with the wall parts then being capable of individual displacement in the opposite direction.

The present invention also proposes that the wall parts shall be so arranged as to diverge to a certain extent in a direction away from the compression arrangement.

The present invention relates to apparatus for producing an elongated element by compressing a fibrous material provided with a binding agent, in which apparatus all of the fibrous material required to produce an elongated element, or a part of said material, is introduced into a compression chamber equipped with compressing means. The compressing means are arranged to be activated to first compress the fibrous material, and then to move the compressed material along a matrix. The compressing means are then moved out of the compression chamber back to their original starting position, and the chamber is again filled with a further batch of fibrous material. This further batch of material is then compressed and displaced by the compressing means along the matrix. The matrix comprises a plurality of wall sections, of which at least a number are arranged for movement relative to the elongated element, this relative movement preferably being effected in the longitudinal direction of the elongated element, or in the direction in which it is produced.

In accordance with the invention, the batch of compressed fibrous material provided with a binding agent is arranged to be transferred, immediately downstream of the compression chamber, to a heating section operating with high-frequency heating means.

In accordance with one embodiment of the invention, the matrix comprises two mutually parallel electrically conductive plates having electrically insulated spacing means arranged therebetween. The spacing means comprises a plurality of mutually parallel matrix components, and the two electrically conductive plates are arranged for movement in their axial directions, these movements preferably being out of time-phase with one another. The matrix component is suitably arranged for continuous oscillating movement.

In accordance with another embodiment of the invention, those surfaces of the spacing means and the plates which face one another, have arranged therein grooves through which moisture released during the drying process can be carried away. This evacuation of the moisture can be facilitated by connecting the grooves to a suction source.

The invention also enables two or more elongated elements to be produced in one and the same apparatus.

The present invention also enables a reinforcing strap, rod or like stiffening means to be incorporated in the elongated element, so as to increase the mechanical strength thereof, means being provided which enable such reinforcing bands to be moved through the compression chamber and through the compressing means.

Preferably, at least one band, rod, wire or like stiffening means is pre-stressed.

ADVANTAGES

Those advantages which may primarily be regarded as being characteristic of an arrangement in accordance with the present invention are that possibilities are created in this way permitting the manufacture of elongated organs with the help of a short production line at the same time as steps are taken to ensure the curing at high frequency of the portions of material which have been moistened with a bonding agent in conjunction with measures such that any moisture released from the organ is able to escape from the heated section.

BRIEF DESCRIPTION OF THE DRAWINGS

A preferred embodiment exhibiting the significant characteristic features of the present invention is described with reference to the accompanying drawings, in which:

FIG. 5 is a simplified side elevational view illustrating the principal construction of apparatus according to the present invention for producing an elongated element, FIG. 6 is a simplified perspective view illustrating the manner in which the compressing means and the compression chamber co-act with one another and also illustrates the matrix construction according to the invention, FIG. 7 is a perspective view illustrating the manner in which bands intended to increase the bending resistance of the elongated element can be incorporated therein, FIG. 8 illustrates an alternative embodiment of a matrix for producing two elongated elements simultaneously, particularly formed for use as structural components in door or window frames, FIG. 9 is a sectional view of the compression chamber having compressing means arranged therein, in conjunction with the introduction of reinforcing bands into the elongated element, for the purpose of increasing the bending resistance thereof and FIG. 10 illustrates in larger scale certain parts of the embodiment illustrated in FIG. 6, this figure illustrating the measures taken to remove moisture released in the heating section.

DESCRIPTION OF THE PREFERRED EMBODIMENT

Figure 1:
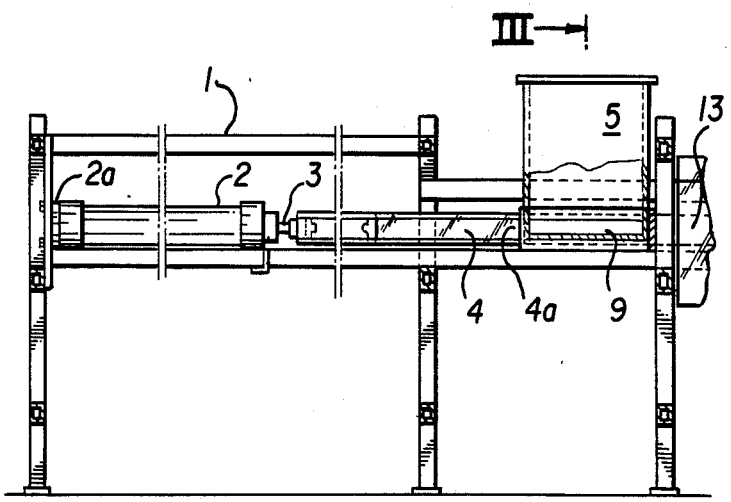
FIG. 1 illustrates a first section of a production line for the manufacture of an elongated organ.

Illustrated with reference to FIG. 1 is a first section of a production line for an arrangement for the manufacture of an elongated organ. This section continues as the second section illustrated in FIG. 2.

In FIG. 1, a frame intended for the arrangement has been allocated the reference designation 1. The frame 1 has been simplified somewhat in the interests of clarity, but exhibits all details necessary to be able to appreciate all the constituent parts. Not illustrated, however, is a control device of in itself simple construction provided for the purpose of controlling in a certain sequence the hydraulic piston and hydraulic cylinder devices illustrated in the arrangement, which are also capable of pneumatic operation if necessary.

Illustrated in FIG. 1 is the manner in which a cylinder 2 having a piston rod 3 is securely attached at the point 2a to a frame 1 and the manner in which its piston (not shown) and the piston rod 3 attached to it are securely attached to a long rod 4.

Actuation of the cylinder 2 will cause the piston rod 3 and its associated piston to impart to the long rod 4 a displacement to the right in FIG. 1. Ahead of the front, right-facing end 4a of the long rod 4 is a material metering arrangement 5. The material metering arrangement 5 may be so executed at its upper part as to exhibit a space for fibrous material (wood fibre material) and a space for a bonding agent (an adhesive), and, with the help of a mixing station (not shown in the Figure), the fibrous material and the bonding agent are mixed in pre-determined proportions and are fed into a pocket forming part of the material metering arrangement 5.

Figure 3:
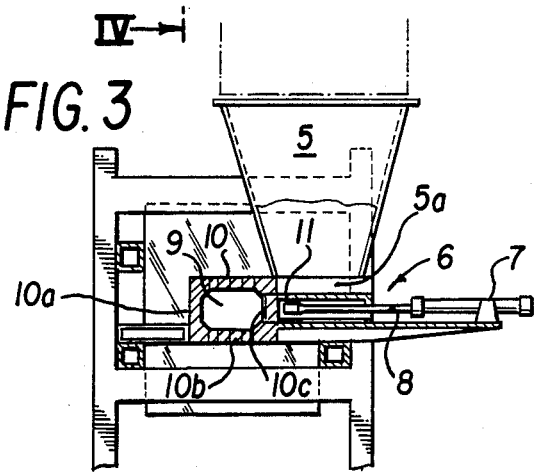
FIG. 3 illustrates a section III—III in FIG. 1.

The material metering arrangement 5, which is illustrated more clearly in FIG. 3, is in the form of a funnel having a lower part 5a. With the help of a piston 11, a cylinder 7, and an associated piston and piston rod 8, a portion of material can be displaced from the lower part 5a of the funnel into a space 9. The space 9 is defined by four wall parts, with the wall parts 10, 10a and 10b being fixed, and the wall part 10c being the front end of the piston 11. After the portion of material has been displaced out and into the space 9 by cylinder 7, it is compressed slightly ahead of the front end 4a of the rod 4 illustrated in FIG. 1.

Figure 2:
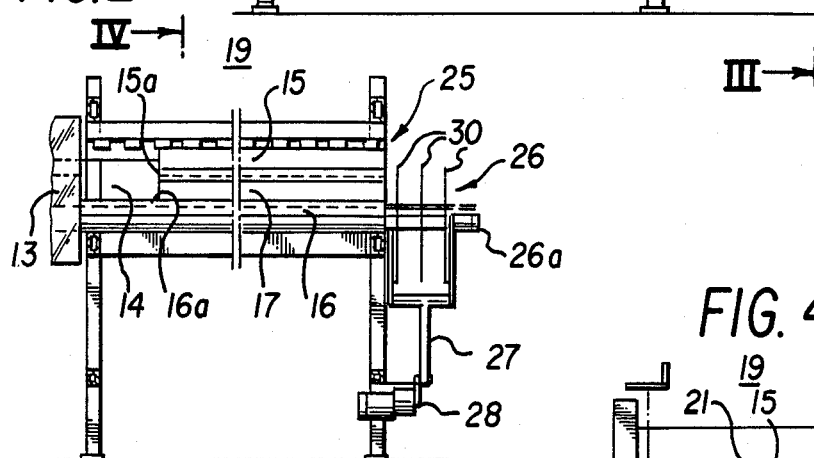
FIG. 2 illustrates a second section of a production line in accordance with FIG. 1.

After a portion of material has been introduced into the space 9, the piston 11 will be in the position illustrated in FIG. 3, and in the manner outlined above the long rod 4 will be displaced by the cylinder 2 and the piston rod 3 to the right in FIG. 1 thereby causing the portion of material to be further displaced into the space 9. This displacement takes place, as illustrated in FIG. 2, via a unit 13 and into a final compression space 14. The final compression space 14 is formed by an upper wall part 15 and a lower wall part 16 and by two additional laterally arranged wall parts 17 and 18.

With reference to FIG. 2, special note should be taken of the fact that the wall parts 15, 16 and 17 are illustrated here in a position such that the ends 15a, 16a of the upper wall part 15 and the lower wall part 16 are situated at a certain distance from the unit 13, but such that, when the portion of material is displaced into the final compression space 14, the final compressor space 14 will be defined by the wall parts 15, 16, 17 and 18, for which purpose these wall parts 15, 16, 17 and 18 will adopt a position in which the ends 15a, 16a of the upper wall part 15 and the lower wall part 16 are directly adjacent to the unit 13.

As soon as the portion of material has finally been compressed into the final compression space 14, the wall parts 15, 16, 17 and 18 are displaced into the position illustrated in FIG. 2 in conjunction with additional displacement of the long rod 4. In this position, the front end 4a of the long rod 4 will extend through the unit 13 and through the previous position of the compression chamber. The unit 13 must exhibit a transcurrent hole with a cross-section corresponding to the cross-section of the long rod 4.

The long rod 4 will then return to the position shown in FIG. 1, and, during the cycle in which the portion of material is filled into the space 9, the wall parts 15, 16, 17 and 18 will be displaced individually back to a position in which the end surfaces 15a, 16a of the upper wall part 15 and the lower wall part 16 are located adjacent to the unit 13, in so doing providing wall parts for the final compression space 14.

Figure 4:
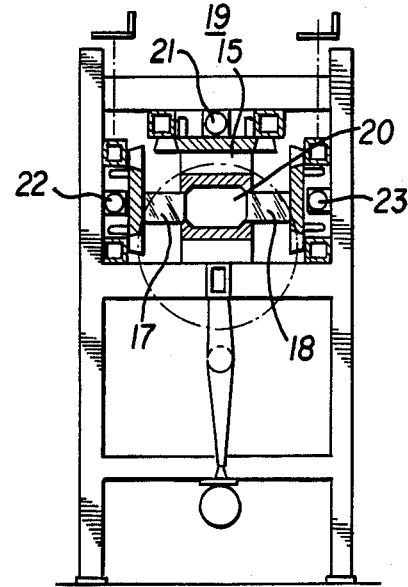
FIG. 4 illustrates a section IV—IV in FIG. 2.

Illustrated with particular reference to FIG. 4 is the manner in which a compressed portion of material 20 is caused to pass through a heated section 19 operating at high frequency. FIG. 4 shows here that the portions of material 20 are given an essentially rectangular section, although it is obvious that other sections can occur. The upper part 15 and the lower wall part 16 in the heated section 19 constitute parts of an in itself previously disclosed high-frequency apparatus, which is not described here in any greater detail for that reason. Particular attention should be drawn to the fact that the upper wall part 15 and the lower wall part 16 extending have outer edges towards each other so as to reduce the distance between them in this way at the same time to improve the distribution of heat into the portion of material 20.

The two opposing laterally arranged wall parts 17 and 18 consist of insulating material. The expression "insulating material" is used in this context primarily to denote a material which does not impair the high-frequency effect on the portion of material 20.

Between the heated section 19 and the material metering arrangement 5 5 forming part of the compression arrangement there is present inside the unit 13 an insulating material, in addition to which the lon rod 4 consists fully, or in this case in part, of such insulating material. More specifically, the front end 4a must, of course, consist of such insulating material.

As far as the insulating material is concerned, it is, of course, possible to utilize any such insulating material which is available, although tests indicate that a borosilicate glass is capable not only of withstanding the pressure imposed at this point by the portion of material 20, but also of providing insulation against the high frequency.

The present invention also relates to an arrangement in which all the wall parts 15, 16, 17 and 18 of the heated section 19, or only some of them, are so arranged as to be capable of displacement in the direction of displacement of the compressed portions of material. After the portion of material and the wall parts have been introduced into a position in which the compression arrangement is defined, the movable wall parts are capable of simultaneous displacement in a direction away from the unit 13 and over a certain distance from the formed compression arrangement together with the long rod 4, whereas subsequently, once the long rod 4 has returned to its position as indicated in FIG. 1, the displacement of each of the individual movable wall parts will occur in sequence in the opposite direction. In order to permit the displacement of the wall parts, the upper wall part 15 interacts with a hydraulic cylinder with an enclosed piston 21, the lower wall part 16 is shown to be fixed, the laterally arranged wall part 17 with a hydraulic cylinder with an enclosed piston 22, and the laterally arranged wall part 18 with a hydraulic cylinder with an enclosed piston 23.

The reason for causing the wall parts to be displaced individually in the opposite direction is that the friction between the wall parts and the material 20 is reduced in this way to such an extent that the material 20 will not accompany said displacement.

If permitted by the resulting friction, a number of wall parts can, of course, be caused to be displaced simultaneously or essentially simultaneously.

It is also proposed that the wall parts 15, 16, 17, 18, or, in this instance, three of these, shall be so arranged as to diverge in a direction away from the compression arrangement or the unit 13 in order to conduct any moisture contained in the portion of material 20 away from the heated section 19.

As the material 20 passes the heated section 19, at the point indicated by the reference designation 25 in FIG. 2, there is present a cutting device 26 having cutter wheels 30 driven by a motor 26a and capable of up-and-down adjustment via a rod 27 and a drive arrangement 28, the cutter wheels 30 of which are so arranged as to cut the material 20 into lengths, in this way producing components for pallets.

FIG. 5 is a side-elevation view illustrating very simply an apparatus 100 for producing an elongated element 104 in accordance with the present invention. The illustrated apparatus includes a hydraulic piston-cylinder device 110 with associated piston and piston rod 109. The piston rod 109 is reciprocatingly movable and co-acts with a compressing means 108 having the form of a ram and projecting slightly into a compression chamber 107, to form a part thereof, namely a rearward wall section of said chamber.

Located immediately above the compression chamber 107 is a feed means 106. Although not shown, the feed means 106 may have a compartment for fibrous material and a compartment for binding agent. The fibrous material and the binding agent are mixed together in a mixing station (not shown), in given quantities, and discharged to a lower space 106a, from where a batch of the total amount of fibrous material required to form a complete elongated element 104 is fed via metering means not shown in FIG. 5.

It will be understood, however, that a ready-mix of fibrous material and binding agent can be charged directly to the feed means 106.

In addition to the method of utilizing a fibrous suspension mixed with binding agent, the elongated element can, of course, be formed from a fibrous material moistened or sprayed with a binding agent, in which case in particular the material can be fed directly to the compression chamber 107 and there placed under pressure.

The material may comprise wood shaving, wastepaper, plastics, wood-chips and like material.

The piston-like compressing means 108 is moved reciprocatingly by the aforesaid hydraulic piston-cylinder device 110 with associated piston and piston rod 109. In FIG. 5, the compressing means 108 is shown in side elevation in a non-compressing, withdrawn position, in which the compression chamber is free to receive said fibrous material. With the compressing means 108 located in this position, the space in front of the compressing means is filled with fibrous material from the feed means 108 (i.e., the compressor chamber 107) 106. This is made possible because, as the compressing means 108 is withdrawn to the illustrated position, it exposes an opening through which said space, or the compression chamber 107, can be filled. When the compressing means 108 is moved to the right in FIG. 5, the fibrous material, or said batch of material, in the compression chamber 107 is compressed against the preceding batch of fibrous material metered to the compression chamber 107, so as to form a part or section of the whole of the intended element.

Thus, mutually sequential parts or sections of the elongated element 104 are formed by compression in the compression chamber 107 and then moved, as a unit, via a matrix to a heating section 105. The compressed fibrous material provided with binding agent is introduced to the heating section 105 through the upstream end-part 105a thereof, and it is there subjected to heat treatment in a conventional high-frequency station, not shown in detail, whereafter the finished elongated element 104 is discharged from the heating section 105, through the downstream end-part 105b thereof.

If desired, the elongated element 104 can be passed from the heating section 105 directly to a treatment station 103, for coating the outer surfaces of said element with an impregnating liquid, paint, varnish or the like.

In FIG. 5, the reference numeral 102 identifies a symbolically illustrated control means for controlling the activation of the compressing means 108; the metering of the fibrous material and binding agent together with the quantities in which they are dispensed; the feed means 106 containing the fibrous material; press means; and the functions of other means incorporated in the apparatus 100. Although the various control components associated with the control means 102 have not been specifically shown or described, the structural design of the control components will be readily understood from the following description of the operational mode of the apparatus.

FIG. 6 illustrates in more detail an apparatus according to the invention for producing an elongated element 104, more specifically two mutually parallel elements 104a, 104b, the elements 104a and 104b are formed by compressing fibrous material provided with bonding agent, in a space 111 formed in the compression chamber 107. A controlled, given quantity of fibrous material provided with binding agent is charged to the space 111 in the compression chamber 107 by means not shown in FIG. 6, and the fibrous material is there compressing by means of compressing means, here referenced 108a. The compressing means 108a is advanced by means of the hydraulic piston-cylinder device 110, the piston rod 109 of which co-acts with a beam 109a rigidly connected to the compressing means 108a, so as not to bend.

The apparatus illustrated in FIG. 6 is intended to produce two elongated elements simultaneously, and therefore includes a further beam 109b and a further compressing means or ram 108b driven by the piston-cylinder device 110. However, since the beam 109b and the ram 108b are identical to the beam 109a and the ram 108a, respectively the beam 109b and the ram 108b will not be described further.

When the compressing means, 108a is moved to the right in FIG. 6, the fibrous material present in the space 111 is first compressed and then moved along a matrix 112. Upon completion of its working stroke, the compression means 108a is withdrawn, out of the compression chamber 107, to expose the space 111 and to enable a further batch of fibrous material to be fed thereinto, this further batch of material then being compressed and displaced by the compressing means 108a.

The matrix 112 comprises a plurality of wall sections, of which at least some are arranged for movement relative to the elongated element 104, this relative movement preferably taking place in the direction of the longitudinal axis of the elongated element 104 or the matrix 112, or in the direction in which the elongated element 104 is formed.

The fibrous material sections formed by the compressing means 108a and containing binding agent are now arranged one after the other, and pass in the form of a single unit through the matrix 112 and are there subjected to heat treatment, with the aid of high-frequency heating means, not shown in FIG. 6, located in the proximity of the compression chamber 107.

For the sake of simplicity, the electric coils required for the high-frequency heating process have not been shown in FIG. 6. These coils, however, co-act with electrically conductive plates 113 and 114.

Thus, the matrix 112 comprises two mutually superposed and mutually parallel electrically conductive plates, of which the upper is referenced 113 and the lower is referenced 114. Arranged between the upper plate 113 and the lower plate 114 are electrically insulated spacers, which comprise a plurality of mutually parallel matrix sections 115, 116, 117, the ends 115a, 116a, 117a, of which are connected together by means of an electrically insulated electrically insulated beam 118. The beam 118 is connected to the piston rod 119 of a hydraulic piston-cylinder device 120. The two electrically conductive plates 113 and 114 are preferably arranged for movement axially, conveniently with the axial movement of respective plates being out of phase with respect to one another. Thus, the upper plate 113 can be arranged to move in the direction of the arrows >>P1>> while the lower plate 114 is arranged for movement in the direction of the arrows >>P2>>. This movement of the electrically conductive plates 113 and 114 can be effected by means of hydraulic piston-cylinder devices, not shown, with associated piston rods, also not shown, and controlled through the control means 102.

It may also be convenient to permit at least the lower electrically conductive plate 114 to accompany the movement of the compressing means 108a to the right in FIG. 6, while holding the upper electrically conductive plate 113 stationary. When the compressing means 108a has completed its working stroke, or when the leading edge 108a' of the compressing means has passed through the space 111, beyond the edge 111a, it may be suitable to cause the upper electrically conductive plate 113 to carry out a corresponding movement, whereafter the upper electrically conductive plate 113 is returned to the position illustrated in FIG. 6. The compressing means 108a, together with the lower electrically conductive plate 114, is then moved back to the position shown in FIG. 6.

The matrix sections 115, 116, 117 form a unit and can be caused to move in an oscillatory fashion by means of the hydraulic piston-cylinder device 120. In all events, it is proposed that the matrix sections 115, 116, 117 are moved via the hydraulic piston cylinder device 120 backwards and forwards at a frequency which is greater than the frequency at which the upper electrically conductive plate 113 and the lower electrically conductive plate 114 are moved. The ratio should be 5–20 times.

FIG. 7 illustrates in a simplified manner a compressing means 108a intended for producing an elongated element which has embodied therein reinforcing bands which increase the bending resistance of the element, and which can be used as a structural member in the manufacture of door frames. The compressing means 108a is provided with two mutually parallel slots 121, 122, into each of which there is inserted a respective reinforcing band 123 and 124, which may be made of a fibre-glass material for example. The reinforcing band 123 is taken from a reel 125, while the reinforcing band 124 is taken from a reel 126, the reinforcing bands 123, 124 preferably being taken from respective reels 125, 126 against the action of a friction coupling, not shown.

FIG. 8 is a sectional view of a matrix in an apparatus in which two elongated elements intended to form the structural members of a door frame are produced. Thus, FIG. 8 illustrates the aforementioned two mutually parallel electrically conductive plates 113 and 114, and the matrix sections 115, 116 and 117, where the latter have been given a configuration corresponding to the form of the door frame.

Other forms can, of course, be selected.

As will also be seen from FIG. 8, the surfaces of the matrix sections 115, 116, 117 facing the lower electrically conductive plate 114 are provided with grooves 130, 131, 132 and 133, while the surfaces of the matrix sections 115, 116, 117 facing the electrically conductive plate 113 are provided with grooves 134, 135 and 136. The elongated element 104a and the elongated element 104b may optionally be provided with a respective recess 140, 141, as illustrated, so as to decrease the amount of fibrous material required in their manufacture. The reinforcing bands 123, 124 can be located in those places in the elongated elements where reinforcement is desired.

When the elongated element to be produced is of such nature that the curing process tends to create internal stresses therein and to curve the element, a reinforcing strap, rod or like stiffening means 123, 124 capable of increasing the bending resistance of the element is preferably passed through the compression chamber 107 and through the compressing means 108 and at least once such band is pre-tensioned, to compensate for the calculated internal stresses.

FIG. 9 is a sectional view of an alternative compression chamber and compression means. In this case, the reinforcing bands 123, 124 are used to reinforce the manufactured elongated element 104. In this embodiment, a metering device for dispensing fibrous material provided with a binding agent comprises a plurality of working pistons or rams 151, 152, 153 with intermediate wall sections 154, 155, where the fibrous material is pressed down into the space 111 formed in the compression chamber 107. The lower portions of the intermediate wall sections 154, 155 are provided with guards 156, 157, which are effective to prevent fibrous material fed into the space 111 from acting downwardly on the reinforcing bands 123, 124 in a manner to dislodge the same, so that the reinforcing bands 123, 124 remain in their selected positions. The intermediate wall sections 154 and 155 may be arranged for vertical movement, so that they can be raised and lowered.

FIG. 10 illustrates in perspective part of the matrix 112, from which figure it can be seen that arranged in the upper surface of the matrix section 115 is the groove 133, while the groove slot 134 is provided in the upper surface of the matrix section 116. The grooves 133 and 134 are connected to a suction means (not shown) for removal of moisture released from the fibrous material during the heat-treatment process.

Preferably, means are provided for lifting the upper electrically conductive plate 113 slightly upon its return movement to the position shown in FIG. 6, thereby contributing in producing a flat surface on the elongated element produced.

Although in the aforegoing it has been stated that the electrically conductive plates 113 and 114 execute a reciprocating movement which differs substantially from the movements carried out by the matrix sections 115, 116, 117, this need not necessarily be the case, since the electrically conductive plates 113, 114 may also be caused to move to the same, or substantially the same extent as the matrix sections 115, 116 and 117. In all events, at least the upper electrically conductive plate 113 can be caused to carry out such an oscillatory movement.

It will be understood that the invention is not restricted to the aforedescribed embodiment, given by way of example only, but that modifications can be carried out within the scope of the following claims.

For example, the matrix sections 115 and 117 can be supported by a plurality of load-absorbing rollers (not shown), so as to prevent the matrix sections from being deflected outwardly by the compression forces, and ensuring that the matrix does not become distorted.

The compressing means 108a and 108b are preferably made of an electrically insulating material, so as not to short-circuit the high-frequency heating means.

The compressing means 108a and 108b, the matrix sections 115, 116, and 117, and the electrically insulated beam 118 may be made from a plastics material which is resistant to high pressure and high temperature.

The reinforcing band, rod, wire or like means used to increase the mechanical strength of a finished elongated element may comprise an electrically insulating material and/or a heat-curable material. The band may also be taken from a magazine in which the band is folded so that, prior to being introduced into the compression chamber, the band can be developed into a > > + > > or a > > U > > -shaped configuration.

At least the upper electrically conductive plate 113 may be arranged to be lifted free from the lower electrically conductive plate 114 during a part of its movement, the latter part of the displacement movement from the compression chamber 107, and/or a part of the return movement, so as to facilitate the removal of moisture.

It will be understand that four reinforcing bands in the form of glass-fibre cords may be introduced behind the compression chamber 107 to the corners or adjacent the corners of the member.

The invention is not, of course, restricted to the embodiment described above by way of example, but may undergo modifications within the context of the following Patent Claims.

I claim:

1. Apparatus for the manufacture of an elongated organ, said apparatus comprising:
    (a) a material hopper which, in use, is filled with a fibrous material moistened with a bonding agent, said material hopper having an outlet;
    (b) a material charging chamber in communication with the outlet of said material hopper;
    (c) a first elongated compression chamber located adjacent to said material charging chamber, said first elongated compression chamber having a movable side wall;

(d) a first fluid cylinder having a rod connected to said movable side wall of said first elongated compression chamber, said first fluid cylinder being adapted to move said movable side wall of said first elongated compression chamber through said material charging chamber, forcing a charge of the fibrous material into said first elongated compression chamber and partially compressing the fibrous material therein;

(e) a second elongated compression chamber located adjacent to said first elongated compression chamber, two opposing side walls of said second elongated compression chamber being formed of an insulating material;

(f) a second fluid cylinder having a rod disposed at a right angle to the rod of said first fluid cylinder, the rod of said second fluid cylinder being connected to a long rod formed of insulating material, said second fluid cylinder being adapted to move said long rod through said first elongated compression chamber, forcing a partially compressed charge of fibrous material from said first elongated compression chamber into said second elongated compression chamber;

(g) a high frequency heating apparatus disposed adjacent to said second elongated compression chamber in position to heat the compressed fibrous material in said second elongated compression chamber, two opposing side walls of said second elongated compression chamber being formed of an electrically conductive material and being disposed between the two previously mentioned side walls of said second elongated compression chamber comprising components of said high frequency heating apparatus;

(h) a third fluid cylinder having a rod disposed in parallel to the rod of said second fluid cylinder, the rod of said third fluid cylinder being connected to at least one of the walls of said second elongated compression chamber, said third fluid cylinder being adapted to move said at least one of the walls of said second elongated compression chamber in the opposite direction to the movement of the compressed fibrous material as the compressed fibrous material moves through said second elongated compression chamber; and (i) means for cutting the compressed elongated material into preselected lengths as it is forced out of said second elongated compression chamber by said second fluid cylinder.

2. Apparatus as recited in claim 1 wherein the insulating material is borosilicate glass.

3. Apparatus as recited in claim 1 wherein the side walls of said second elongated compression chamber diverge from each other in the direction away from said second fluid cylinder.

4. Apparatus as recited in claim 1 wherein the rod of said third fluid cylinder is connected to one of the side walls of said second elongated chamber that is a component of said high frequency heating apparatus and further comprising a fourth and fifth fluid cylinder each of which has a rod disposed is parallel to the rod of said second fluid cylinder, the rods of said fourth and fifth fluid cylinders being connected to the side walls of said second elongated chamber that are formed of an insulating material and said fourth and fifth fluid cylinders being adapted to move the side walls of said second elongated chamber that are formed of an insulating material in the opposite direction to the movement of the compressed fibrous material as the compressed fibrous material moves through said second elongated chamber.

* * * * *